UNITED STATES PATENT OFFICE.

ADDISON C. FOX, OF BALTIMORE, MARYLAND.

IMPROVEMENT IN ADHESIVE COMPOSITIONS.

Specification forming part of Letters Patent No. 191,420, dated May 29, 1877; application filed March 23, 1877.

*To all whom it may concern:*

Be it known that I, ADDISON C. FOX, of the city of Baltimore, State of Maryland, have invented certain new and useful Improvements in Cements or Adhesive Compositions; and I hereby declare the same to be fully, clearly, and exactly described as follows:

This invention relates to compositions for fastening together various substances, such as wood, glass, porcelain, leather, paper, &c.; and it consists in a combination of the substances hereinafter named, substantially in the proportions described.

The ingredients of my composition are: chromic acid, ($H_2CrO_4$,) aqua-ammonia, ($NH_3$,) F. F. F., sulphuric acid, ($H_2So_4$,) C. P., ammonio-sulphate-of-copper solution, ($NH_32So_4$,) white paper, and water, constituting solution No. 1; and Russia isinglass and acetic acid, ($C_2H_4O_2$,) constituting solution No. 2.

These ingredients are compounded as follows: About forty grains of crystals of chromic acid are dissolved in four drams of water, and four drams of strong aqua-ammonia are added. To this solution are then added about ten drops of pure sulphuric acid, and afterward one ounce of saturated solution of ammonio-sulphate of copper, and about one dram of white paper. The second solution is formed by dissolving Russia isinglass in dilute acetic acid (about one part of acid to seven of water) until the solution is of about the consistency of honey. This solution is preferably effected over a water-bath.

In order to use the compositions, the solutions are applied one to each of the surfaces to be united, which latter are then pressed together and set aside for the composition to dry. The article should preferably be placed in the sunlight.

It is not essential that the portions to be united should be pressed together when the compositions are first applied and are still moist. Even should they become dry, upon moistening one of them they will adhere firmly. If this moistening be done with the lips, only the isinglass coating should be moistened, as the cupric composition is deleterious when taken into the system.

While I have described the use only of Russia isinglass, other and inferior qualities will answer the same end, but not quite as well. The function of the acetic acid is merely to prevent decomposition of the isinglass, and other substances possessing the same properties, such as nitrous ether, may be substituted for the acetic acid.

The composition I have described is unattacked by acids and alkalies, and is wholly unaffected by steam or hot or cold water. These properties make it especially useful for mending broken crockery or glassware.

In an application of even date herewith, I have described this composition as applied to the manufacture of envelopes, for which, by reason of their use and nature, it is specially fitted. I therefore except such from the scope of the present case.

Having thus described my invention, what I claim as new, and desire to secure by Letters Patent, is—

1. The compositions herein described, to be used in combination, as set forth, the said compositions consisting, respectively, of chromic acid, ammonia, sulphuric acid, ammonio-sulphate of copper, and paper, and of isinglass and acetic acid, as set forth.

2. An adhesive composition having as ingredients chromic acid and isinglass, dissolved in a suitable acid solvent, substantially as described.

ADDISON C. FOX.

Witnesses:
R. D. WILLIAMS,
EDWARD J. G. OTTO.